United States Patent
Hayes

[11] 3,896,577
[45] July 29, 1975

[54] ONE PIECE ANIMAL IDENTIFICATION TAG

[76] Inventor: Norman J. Hayes, care of Standing Star Simmental Ranch, North of Cody, Park County, P.O. Box 618, Cody, Wyo. 82414

[22] Filed: Apr. 29, 1974

[21] Appl. No.: 465,285

[52] U.S. Cl. .................................. 40/301; 110/301
[51] Int. Cl.² .......................................... G09F 3/00
[58] Field of Search ............................. 40/300–302, 40/305, 22, 21 R; 24/73 P, 73 PF

[56] References Cited
UNITED STATES PATENTS
| | | | |
|---|---|---|---|
| 3,346,980 | 10/1967 | Wallace | 40/302 |
| 3,399,478 | 9/1968 | Tarver | 40/300 |
| 3,512,289 | 5/1970 | Hayes | 40/301 |

FOREIGN PATENTS OR APPLICATIONS
| | | | |
|---|---|---|---|
| 1,500,904 | 7/1969 | Germany | 24/73 PF |

Primary Examiner—Robert W. Michell
Assistant Examiner—John H. Wolff
Attorney, Agent, or Firm—Bruce G. Klaas, Esq.

[57] ABSTRACT

A one piece animal identification tag comprising an identification portion and an attachment portion. The identification portion extends outwardly from the upper surface of the ear and is held in a vertically upwardly extending position by a shaft portion which extends through the ear. The tag is held in vertically extending position by an enlarged head portion on the end of the shaft portion having abutment surfaces engaging the lower inner surface of the ear and leg portions extending from the identification portion into abutting engagement with the outer upper surface of the ear.

21 Claims, 5 Drawing Figures

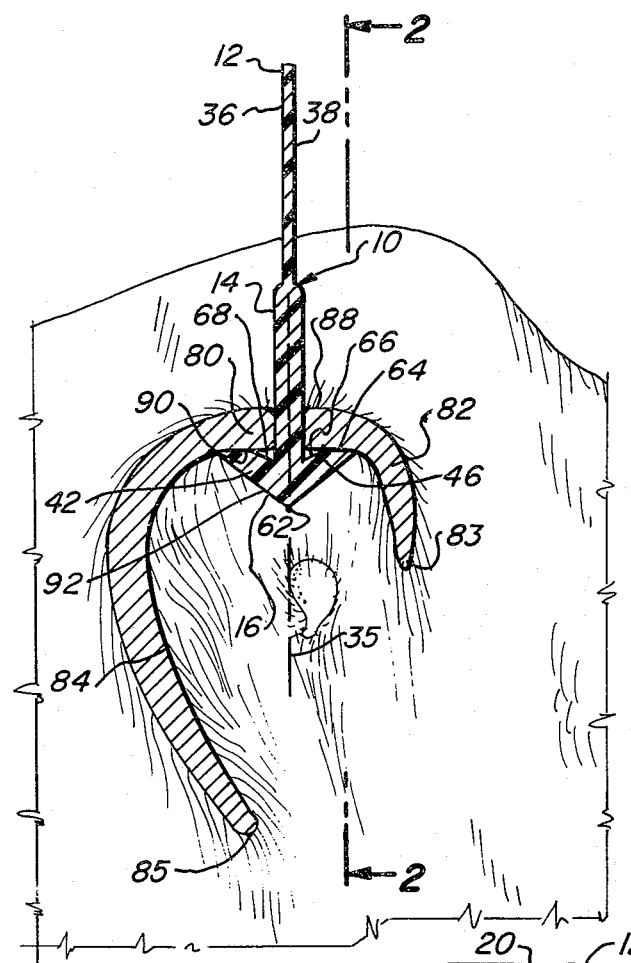
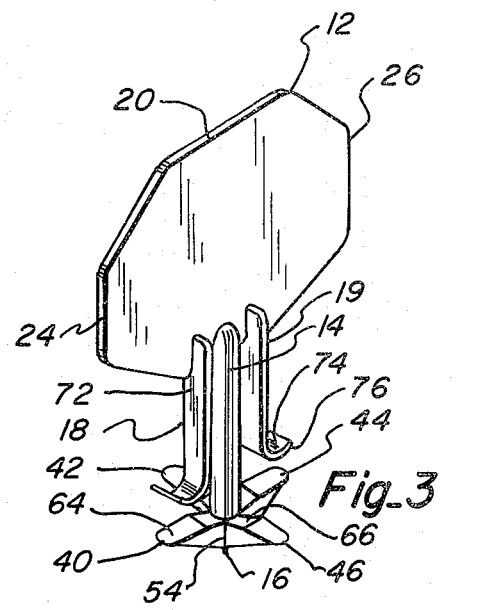
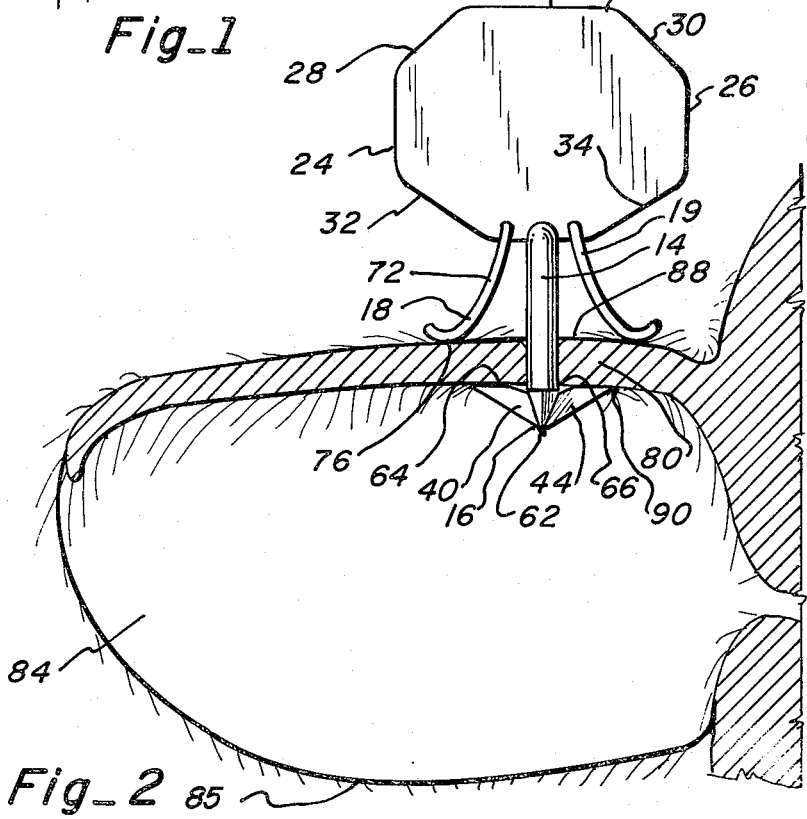
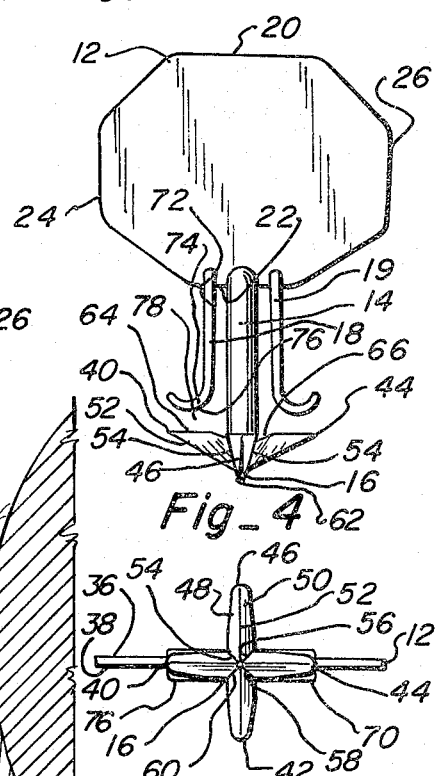

ONE PIECE ANIMAL IDENTIFICATION TAG

BACKGROUND AND SUMMARY OF INVENTION

This invention relates to identification tags for animals and, more particularly, to an identification tag adapted to be mounted on the top of an ear of an ox type animal such as the bovine species so as to stand up on the ear in a vertical position.

The concept of utilizing identification tags on amimals is at least as old as the disclosures in U.S. Pat. Nos. 29,619, 48,055, and 54,127 and there have been a substantial number of patents granted in the art since that time.

The most common type of identification tag presently being utilized for cattle appears to be the ear mounted type tag of the general type disclosed in my prior U.S. Pat. No. 3,260,007. The presently utilized tag assemblies may be generally characterized as "hang-down" types in that they are mounted in the relatively thin lower rear part of the animal ear and hang downwardly in a more or less downwardly depending position. One of the problems with such tag assemblies is that they are difficult to see from a distance and they are often obscured by the animal ear, animal hair on the ear which is often quite heavy and lengthy, and the animal head or body. Another problem with ear tags of the hang down type is that they may be caught in fences, building materials, and vegetation with the result that they may be broken apart or torn from the animal ear.

The present invention is adapted to solve the foregoing problems, and others, by utilizing a stand-up type ear tag of particular characteristics mounted on an animal ear in a particular place in a particular manner. While the general concept of a stand-up type ear tag is disclosed in U.S. Pat. No. 492,838, the present invention involves providing new and improved ear tag structure adapted to be mounted on a particular portion of the animal ear. While the outermost portions of the ear of the bovine species are relatively thin, there is a relatively thick upper central portion relatively closely adjacent the animal head which I have found to be particularly well suited for attachment of a stand-up type ear tag.

The structure of the tag comprises a tag member having an identification portion adapted to be mounted in a vertically upwardly extending position in unpwardly spaced relationship to the selected portion of the ear and fixedly held thereon by attachment means in the form of a support shaft portion extending through the selected ear portion and having a head portion, which is inserted through the ear portion from above, and held in abutting retaining engagement with the inner surface of the ear by resilient arm portions extending from the identification portion toward and being resiliently supported on the outer surface of the ear.

BRIEF DESCRIPTION OF THE DRAWING

In the accompanying drawing, which shows an illustrative and presently preferred embodiment of the inventive concepts, FIG. 1 is a side elevational view of the head of an animal of the bovine species showing, in cross-section, a tag of the present invention mounted on one ear;

FIG. 2 is a sectional view of the tag in mounted position taken along the line 2—2 of FIG. 1;

FIG. 3 is a perspective view of the tag of FIGS. 1 and 2;

FIG. 4 is a side elevational view of the tag of FIGS. 1-3; and

FIG. 5 is an end view of the tag of FIG. 4

DETAILED DESCRIPTION

It is to be understood that the terms "vertical", "upstanding", "upwardly", "downwardly", "inner", "outer" and variations thereof, as used in this specification and the appended claims relate to the normal mounted and assembled position of the tag member on the ear of an animal.

The tag member 10 is made of one piece of molded plastic material, a urethane material being presently preferred, comprising an identification portion 12 and attachment means in the form of a shaft portion 14, an enlarged retaining head portion 16, and resilient supporting leg means in the form of a pair of flexible leg portions 18, 19.

The identification portion is of polygonal peripheral configuration defined by upper and lower parallel edge surfaces 20, 22, opposite side edge surfaces 24, 26, and inclined connecting edge surfaces 28, 30, 32, 34. In the presently preferred embodiment, the identification portion has a height of approximately 1.50 inches, as measured between surfaces 20, 22, a width of approximately 2.0 inches, as measured between surfaces 24, 26, and a thickness of approximately 0.065 inch. A pair of oppositely facing identification surfaces 36, 38 are provided by the identification portion and the plastic material is such as to permit substantially unlimited resilient flexing and bending of the identification portion under application of externally applied forces. Suitable identification indicia may be marked on surfaces 36, 38 as by ink markings, hot stamping, or the like.

The shaft portion 14 is integral with the identification portion and extends outwardly from surface 22 centrally of the identification portion. In the presently preferred embodiment, the length of the shaft portion is approximately 1.0 inch and its diameter is approximately 0.25 inch so as to have a high degree of resilient flexible movement under application of externally applied forces while also normally located with its central axis 35 generally within and parallel to the planes of surfaces 36, 38. In addition, the relatively small area of integral connection between the relatively large diameter shaft portion and the relatively small thickness indentification portion provides highly resilient connecting means therebetween enabling a high degree of resilient movement of the identification portion relative to the shaft portion under application of externally applied forces.

The retaining head portion 16 comprises four equally spaced resilient prong members 40, 42, 44, 46 which are of similar construction and normally extend generally transversely laterally outwardly relative to the central axis of the shaft portion. Each prong member comprises a pair of inclined outer surfaces 48, 50 which have an inclined intersection edge 52. The outer surfaces 48, 50 of each prong member intersect the adjacent outer surfaces of adjacent prong members along lines 54, 56, 58, 60 which are outwardly converging and intersect to form a relatively sharp terminal point 62. A first upwardly facing inner ear surface abutting means for abuttingly engaging an inner surface of an animal ear is provided on the retaining head portion 16 in the form of relatively flat back surfaces 64 on each prong member. Each prong has a first relatively flat back surface 64 which extends in a first plane at substantially right angles to the central axis of the shaft portion and a second relatively flat back surface 66 which extends in a second plane inclined relative to the first plane to provide a relief notch 68 permitting inward flexing movement of each prong member toward the central axis of the shaft portion. The outer edge 70 of each prong member is rounded as shown in FIG. 5.

The flexible leg portions 18, 19 are of similar construction but reversely oriented. Each leg portion comprises an elongated support portion 72 of generally rectangular cross-sectional configuration which, in a normal unstressed position, extends generally parallel to the central axis of the shaft portion. Each leg portion terminates in shoe means in the form of a rounded outwardly extending abutment shoe portion 74 providing a second downwardly facing outer ear surface abutting means in the form of a rounded flat abutment surface 76 facing toward the flat surfaces 64, 66 on the prong members and spaced therefrom, in a normal unstressed condition, FIGS. 3-5, by a gap 78 of a width which is less than the thickness of the portion of the ear of the animal on which the tag is to be mounted. In the presently preferred embodiment, the width of gap 78 is approximately one-half of the thickness of the portion of the animal ear. The support portions 72 are spaced relatively closely adjacent the shaft portion so that the surfaces 76 are positioned opposite and in overlapping relationship to surfaces 64, 66 of two opposite ones of the prong members. In addition, the leg portions 18, 19 have a high degree of resiliency both in the area of attachment to the identification portion and throughout their lengths so as to facilitate assembly and adaptation to various ear configurations.

While the inventive concepts are applicable to various kinds of animals, the tag hereinbefore disclosed is particularly adapted for use with animals of bovine species. As generally illustrated in FIGS. 1 and 2, the ear of bovine type animals comprises a generally horizontally extending upper portion 80 which interconnects a relatively short vertically downwardly extending front lobe portion 82 terminating in a lower anterior border 83 and a relatively long vertically downwardly extending rear lobe portion 84 terminating in a posterior border 85. In general, the ear tapers outwardly and is relatively thin at the outer edges. There is an area of the animal ear closely adjacent the animal head which I have discovered to be particularly well suited for mounting of the animal tag of the present invention. The area is located along the ear portion 80 approximately one-third the distance from the juncture of the ear and the animal head to the outer end of the ear. The area is characterized by being relatively thick and dense while providing a relatively flat generally horizontally extending upwardly facing outer surface 88 and a relatively flat generally horizontally extending downwardly facing inner surface 90. In addition, at this area, an inner pocket 92 is provided between the front and rear lobe portions 82, 84 which is relatively free of hair whereas an abundance of hair is often found at other areas of the ear which often obscures the conventional hanging tags of the prior art.

In the assembled position of the ear tag of the present invention, the head portion 16 is located within the ear pocket 92 with the flat upper surfaces 64 of prong members 40, 42, 44, 46 in abutting engagement with the flat downwardly facing surface 90 of the ear portion 80. Thus, because of the location, the possibility of any foreign materials being caught on the head portion during any activity of the animal are substantially reduced. In addition, there is little likelihood of dirt or other foreign material accumulating about the head portion so that the danger of infection at the time of piercing of the ear, and afterward, is substantially reduced. Shaft portion 14 extends through a pierced opening in the ear portion 80 and extends vertically upwardly therefrom. Leg portions 18, 19 are resiliently outwardly upwardly deflected, as shown in FIG. 2, with abutment surfaces 76 of shoe portions 74 resiliently pressed into abutting engagement with the upper ear surface 88. The resilient forces thus induced in leg portions 18, 19 pull the abutment surfaces 64 into light abutting engagement with the inner ear surface 90. The arrangement is such that surfaces 64 lay flat against the inner surface of the ear to reduce the possibility of irritation to the ear which would result from a small area of contact or from a substantially point contact. This arrangement solves an irritation problem which was encountered in a construction such as shown in my prior U.S. Pat. No. 3,512,289. The notch portions 66 on prong members 40, 42, 44, 46 increase the flexibility of the prong members and provide a gap between the inner ear surface 90 and the shaft portion 14. Since the ear tag is located on an upper surface of the ear where the length of the hair is considerably shorter and where the hair tends to lay flat against the ear and hang downwardly along the sides of the ear, the tendency for foreign matter to accumulate is greatly reduced. The identification portion 12 normally stands vertically upright but it is highly flexible and resilient relative to the shaft portion 14 due to the connecting means therebetween so as to be easily bent 90° to a generally horizontal position and easily twisted in any direction under forces applied in use on the animal. During such movement, the arm portions 18, 19 will be carried with the identification portion and resiliently displaced relative to the shaft portion. When the external forces are removed, the identification portion and the leg portions will return to the position of FIG. 2. Thus, anytime the animal rubs against an object or bumps into a fence rail or the like or moves its head along barbed wire or the like, the identification portion 12 has virtually unlimited resilient movement relative to the shaft portion 14 to substantially reduce injury to the animal or damage to the ear tag assembly. Under severe stress, the upper portions of shaft portion 14 may undergo some resilient twisting movement relative to the lower portions.

In order to mount the identification tag on the ear of an animal, a conventional ear piercing tool, of the type disclosed in my prior U.S. Pat. No. 3,512,289, is utilized. The tag is mounted in the tool and a piercing point on the tool is forced through the uppermost portion of the animal ear, next adjacent the animal head, with the result that the head portion 16 is carried through the animal ear with prong members 40, 42, 44, 46 being resiliently inwardly deflected toward the shaft portion 14 during passage therethrough. When the head portion 16 clears the passage in the animal ear, the prong members resiliently outwardly expand to locate abutment surfaces 64 in overlapping relationship to the inner ear surface 90. Thus, when the tool is withdrawn from the ear, the head portion 16 is released and the tag remains permanently fixed to the animal ear in a vertically upstanding position.

It is to be understood that the dimensional characteristics of the ear tag are given herein solely by way of illustration and that the dimensional characteristics may be varied as necessary or desirable to obtain desired stability of the tag in use.

Furthermore, it is contemplated that various details of construction of the illustrative embodiment of the inventive concepts hereinbefore described may be variously otherwise embodied. Therefore, it is intended that the appended claims be construed to cover alternative embodiments of the invention except insofar as limited by the prior art.

The invention claimed is:

1. A one piece identification tag member of molded resilient plastic material for mounting on the top of the ear of an animal in a vertical attitude comprising:
   an upper identification portion adapted to be mounted in a vertical attitude above the ear of an animal,
   a shaft portion downwardly depending from said identification portion and adapted to extend through the ear,
   a retaining head portion on the lower end of said shaft portion having first upwardly facing inner ear abutting means for engaging an inner surface of the ear and supporting said head portion thereagainst,
   resilient supporting leg means downwardly depending from said identification portion for supporting said identification portion and said shaft portion relative to the ear, and
   second downwardly facing outer ear abutting surface means on the lower end of said leg means for engaging an outer surface of the ear to hold the tag member in the vertical attitude while permitting temporary resilient deflected displacement of said identification portion relative to said shaft portion.

2. The invention as defined in claim 1 and wherein: said supporting leg means comprising a pair of leg portions spaced closely adjacent said shaft portion and extending generally parallel to said shaft portion.

3. The invention as defined in claim 2 and wherein: said leg portions having a generally rectangular cross-sectional configuration, and
   a lower terminal portion on each of said leg portions extending laterally outwardly relative to said shaft portion, said second downwardly facing abutment surface means being located on said lower terminal portion.

4. The invention as defined in claim 1 and wherein: said retaining head portion comprising a plurality of prong member extending laterally outwardly from said shaft portion.

5. The invention as defined in claim 4 and wherein: said first upwardly facing inner ear abutting means comprising a first upwardly facing abutment surface on each prong member laterally outwardly spaced from said shaft portion, and
   a second upwardly facing surface on each prong member between said first upwardly facing abutment surface and said shaft portion, said second upwardly facing surface being downwardly offset from said first upwardly facing abutment surface.

6. The invention as defined in claim 5 and wherein: said second upwardly facing surface being inclined downwardly from said first upwardly facing abutment surface to said shaft portion.

7. The invention as defined in claim 6 wherein said prong members are resiliently deflectable downwardly during abutting contact between said first upwardly facing abutment surface and the inner ear surface.

8. The invention as defined in claim 7 wherein said second upwardly facing surface being downwardly spaced from the inner ear surface during abutting contact between said first upwardly facing abutment surface and the inner ear surface so as to provide a gap therebetween.

9. The invention as defined in claim 8 wherein said prong members having upwardly inclined downwardly facing lower edges, said prong members being resiliently upwardly deflectable to enable mounting of the tag through the ear.

10. The invention as defined in claim 9 wherein the lower surfaces of said prong members terminate in a sharp point.

11. An animal identification tag adapted to be mounted in a vertical upstanding position on an ear of an animal, the ear comprising a frontal downwardly extending lobe portion, a rear lobe portion, and an upper interconnecting portion having upper and lower surfaces, said tag comprising:
    an identification portion adapted to be mounted in vertically spaced relationship above the upper surface of the upper interconnecting portion of the ear,
    a vertically extending shaft portion connected at the upper end to said identification portion and adapted to extend downwardly through the upper interconnecting portion of the ear and beyond the lower surface of the ear,
    inner ear surface abutting means on the lower end of said shaft portion providing an upwardly facing abutment surface for abutting engagement with the lower inner surface of the ear to hold the tag in the vertical attitude on the ear,
    outer ear surface abutting means associated with said identification portion and said shaft portion providing a downwardly facing abutting surface for abuttingly engaging the upper outer surface of the ear,
    said inner ear surface abutting means and said outer ear surface abutting means and said shaft portion being spaced and arranged for cooperatively holding said identification portion in a vertically upright position above the ear, and
    resilient connecting means between said identification portion and said shaft portion for permitting resilient flexible displacement of said identification portion relative to said inner ear surface abutting means from the vertically upright position to various laterally displaced positions under application of externally applied forces and for permitting resilient flexible displacement of said identification portion from the various laterally displaced positions to the vertically upright position upon removal of the externally applied forces.

12. The invention as defined in claim 11 wherein said outer ear abutting means comprising:
    resilient supporting leg means downwardly depending from said identification portion with said downwardly facing abutment surface located on the lower end of said leg means for resiliently supportively holding said downwardly facing abutment surface on the outer surface of the ear.

13. The invention as defined in claim 12 and wherein:
said supporting leg means comprising a pair of leg portions spaced closely adjacent said shaft portion and extending generally parallel to said shaft portion.

14. The invention as defined in claim 13 and wherein:
said leg portions having a lower terminal portion extending laterally outwardly relative to said shaft portion, and
said downwardly facing abutment surface being located on said lower terminal portion and extending laterally outwardly relative to said shaft portion.

15. The invention as defined in claim 12 and further comprising:
a retaining head portion on the lower end of said shaft portion,
said retaining head portion being of larger cross-sectional area than said shaft portion, and
said inner ear surface abutting means being located on said head portion.

16. The invention as defined in claim 15 and wherein:
said retaining head portion comprising a plurality of prong members extending laterally outwardly from said shaft portion.

17. The invention as defined in claim 16 and wherein said head portion further comprising:
a first upwardly facing inner ear abutment surface on each prong member laterally outwardly spaced from said shaft portion, and
a second upwardly facing surface on each prong member between said first upwardly facing abutment surface and said shaft portion, said second upwardly facing surface being downwardly offset from said first upwardly facing abutment surface.

18. The invention as defined in claim 17 and wherein:
said second upwardly facing surface being inclined downwardly from said first upwardly facing abutment surface to said shaft portion.

19. The invention as defined in claim 18 wherein said prong members being resiliently deflectable downwardly for providing full abutting contact between said first upwardly facing abutment surface and the inner ear surface.

20. The invention as defined in claim 19 wherein said second upwardly facing surface being downwardly spaced from said first upwardly facing abutment surface a sufficient distance so as to provide a gap between the inner ear surface and said second upwardly facing surface.

21. The invention as defined in claim 20 wherein said prong members having upwardly inclined downwardly facing lower edges, said prong members being resiliently upwardly deflectable for mounting of the tag through the ear.

\* \* \* \* \*

Disclaimer

3,896,577.—*Norman J. Hayes*, Cody, Wyo. ONE PIECE ANIMAL IDEN-
TIFICATION TAG. Patent dated July 29, 1975. Disclaimer filed
Apr. 26, 1976, by the assignee, *Y-Tex Corporation*.
Hereby enters this disclaimer to all claims of said patent.
[*Official Gazette July 20, 1976.*]